Sept. 9, 1952

G. R. CLARK 2,610,318

ELECTRONIC FREQUENCY MODULATOR

Filed Dec. 3, 1947

2 SHEETS—SHEET 1

INVENTOR.
GILBERT R. CLARK

BY

R. H. Morris

ATTORNEY

INVENTOR.
GILBERT R. CLARK
BY
[signature]
ATTORNEY

Patented Sept. 9, 1952

2,610,318

UNITED STATES PATENT OFFICE 2,610,318

ELECTRONIC FREQUENCY MODULATOR

Gilbert R. Clark, Nutley, N. J., assignor to International Standard Electric Corporation, New York, N. Y., a corporation of Delaware Application December 3, 1947, Serial No. 789,415

6 Claims. (Cl. 332—30)

This invention relates to modulation systems and more specially to improved methods and means for modulating the frequency of a sustained alternating voltage, such as a carrier, in accordance with signals.

A principal object of the invention is to provide an improved method and apparatus for producing relatively large frequency swings with respect to a mean or center frequency, and with a relatively high order of frequency stability both in the center frequency and the frequency swings corresponding to predetermined signals.

Another principal object is to provide an improved frequency modulation arrangement which is useful in the modulation of any carrier whether in the audio frequency or radio frequency spectrums.

In general, prior known methods of direct electronic frequency modulation can be divided into two categories. In one category, the carrier is modulated by means of a signal-controlled reactance which forms part of the frequency-determining oscillatory circuit of the carrier source. An example of one such arrangement is the reactance tube method, wherein the signals control the reactance of an electron tube which is connected as part of the frequency-determining circuit. Another such example is the use of the Miller capacity effect to control a carrier frequency. In the second category of known frequency modulation arrangements, there is employed a grid-controlled vacuum tube which is operated as a signal controllable resistance element in series with a reactance, to control thereby the magnitude and phase angle of the combined series impedance of the tube and reactance.

One of the serious disadvantages of these prior known methods of frequency modulation is that the frequency stability is dependent, in large measure, upon certain inherent characteristics of the tubes, which characteristics are functions of the tube plate current. Among these functions may be mentioned transconductance, amplification factor, and dynamic plate resistance. However, as is wellknown, these characteristics for any given tube are not rigidly related to the plate current of the tube, and very often one or more of the characteristics varies during the life of the tube, or under certain operating conditions. In fact, variations may frequently be encountered between supposedly identical tubes of the same type number, or physical construction. The variability of the tube characteristics is reflected as a corresponding instability in the frequency of the oscillator with which the tube cooperates, and it also affects the modulation characteristics which relate input signal voltage to output frequency modulation.

Accordingly, it is another principal object of this invention to provide a frequency modulation method and system whose operation is, within certain limits, not deleteriously affected by variation in the above-noted or other characteristics of the electron tubes.

Another object is to provide a method and apparatus for effecting frequency modulation by electronically switching in and out of a frequency-determining network, and in accordance with signal or modulating voltages, a reactance of constant value, or resistance of constant value, or a combination of reactance and resistance of constant value, the ratio of in and out switching times determining the average effect upon the frequency of the associated oscillator.

A feature of the invention relates to a frequency modulation system employing an oscillator with a tank circuit or the like, a frequency-determining element of which is effectively switched in and out of circuit electronically and at an averaged rate determined by the modulating potentials.

Another feature relates to a frequency modulation system having a frequency-determining element which is electronically switched in and out effectively to modulate a carrier; in conjunction with circuit arrangements for rendering the frequency stability of the modulated carrier substantially independent of such factors as tank circuit A. C. voltage and the like.

Another feature relates to an improved frequency modulator employing an oscillator of the resistance-capacitance network control type, wherein the frequency-determining elements are all of fixed value but their effect on the oscillator is controlled by electronic switching means.

Other features and advantages not particularly set forth will appear as the ensuing description proceeds.

Inasmuch as the invention is not limited to any particular kind of intelligence or control signal to be transmitted, the invention will be illustrated in a generic way so far as the signal source is concerned, and the component parts of the system whose individual operations are well-known in the art will be illustrated schematically for the purpose of simplifying the drawing.

Accordingly in the drawing.

Figure 1:
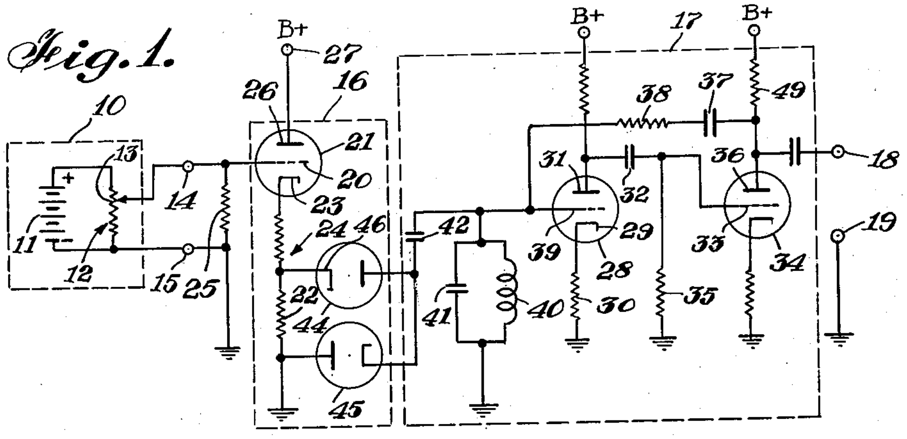
Fig. 1 is a schematic wiring diagram of a frequency modulation system embodying the inventive concept.

Referring to Fig. 1, the block 10 represents any well-known source of signal or control voltages which are to be converted into corresponding frequency-modulated carrier. This source is generically represented as a high impedance source comprising, for example, a battery 11 and a potentiometer 12, whose adjustable element can be moved to determine the desired signal. For example, the source 10 may be any well-known telemetering transmitter or it may be a device such as a facsimile transmitter, wherein the resistance 13 represents the load resistor of the light responsive phototube. In fact, the resistance 12 may represent the load resistor of any well-known signal source. The signals from source 10 are applied to the input terminals 14, 15, of a modulation control unit 16, and thence to an oscillator unit 17, and the frequency modulated signals are taken off at the output terminals 18, 19. While the drawing shows an oscillator 17 of the double tube type, it will be understood that any other well-known electron tube oscillator may be employed.

The input signals at terminals 14, 15, are applied to the control grid 20 of any well-known electron tube amplifier 21, and while the drawing shows a triode, any multi-grid electron tube can be employed. The tube 21 is shown connected so as to act as a so-called cathode follower, wherein the input signals appear as potential variations across the cathode follower load resistance 22 which is connected between the cathode 23 and ground; and if desired, in series with another but higher resistance 24 to prevent excessive dissipation within the tube since resistance 22 preferably has a low value. In the conventional manner, a high resistance 25 is connected between grid 20 and ground. Instead of using a series current-limiting resistor 24, the cathode follower resistance 22 alone may be used and the positive D. C. operating potential applied to anode 26 from the D. C. plate supply source 27 may be correspondingly reduced. In either case, a proportionate part of the potential obtained from the source 10 appears across resistor 22.

Figure 2:
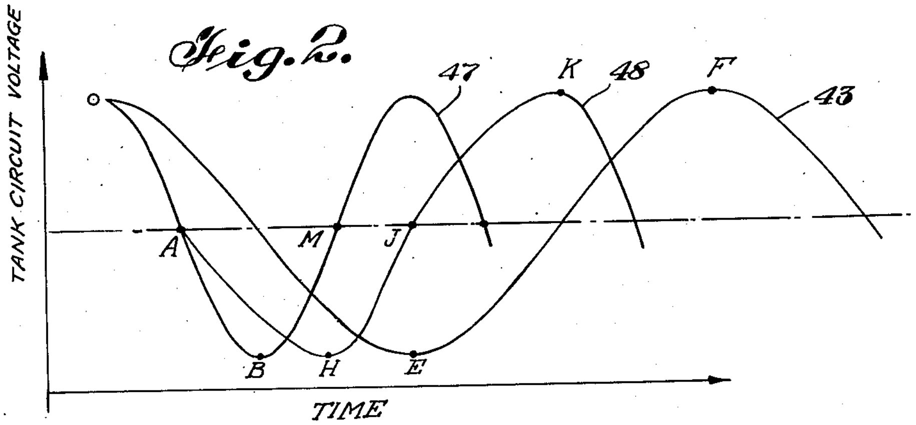
Fig. 2 shows a series of graphs explanatory of the operation of Fig. 1.

The oscillator 17 may be of the type having for example, a first grid-controlled tube 28 whose cathode 29 is suitably biased by cathode resistor 30, and whose output anode 31 is coupled by condenser 32 to the control grid 33 of a feedback control tube 34. In the conventional way, a grid leak resistor 35 is connected between grid 33 and ground. The anode 36 of tube 34 is coupled for oscillation feed-back action through condenser 37 and resistor 38 to the control grid 39. The frequency of oscillator 17 is determined by the usual tuned oscillatory or tank circuit comprising inductance 40, shunt condenser 41 and also including shunt condenser 42 in a manner which will be described. The values of the various components of the tank circuit are chosen so that when no voltage is applied to condenser 42 from the modulator unit 16, the oscillator 17 generates a sustained and fixed frequency at the lower end of its modulation range, as represented for example by the graph 43 (Fig. 2). In order to control the effective switching in and out of the condenser 42 and thereby controlling the frequency of the carrier at the output terminals 18, 19, a pair of oppositely poled diodes 44, 45, are bridged across the resistor 22; and the anode of diode 44 as well as the cathode of diode 45 are connected in parallel to the condenser 42.

Let it first be assumed, for purposes of explanation, that no voltage is developed across the resistor 22, that is to say, assume that the tube 21 is removed from its socket. Referring to Fig. 2, which shows the tank circuit voltage as a function of time, the diode 45 is conductive between the points O and E, whereas the diode 44 is conductive between the points E and F. Since this A. C. tank voltage renders diodes 44 and 45 conductive throughout every alternate half cycle, the fact is that the condenser 42 is effectively in parallel with the tank circuit units 10 and 11 substantially all the time, and the oscillator frequency is at the lower limit of the modulation range as represented by graph 43.

Assume now that the tube 21 is replaced in its socket and that potentiometer 13 is adjusted so that the potential which appears across resistor 22 is more than twice the peak value of the A. C. tank circuit voltage. During the negative peak of the A. C. tank voltage, condenser 42 acquires a charge through the conductivity of diode 45. After this first negative peak, a steady state condition exists, during which no further current flows into condenser 42 because the potential across resistor 22 maintains the cathode 46 too positive with respect to its anode and therefore the initial charge retained by condenser 42 blocks diode 45 against further condition. Under this condition, condenser 42 is effectively disassociated from the tank circuit units 40, 41, and the oscillator 17 generates at the upper limit of the modulation range as represented by graph 47.

Graph 48 represents an intermediate condition, which exists when the potential across resistance 22 equals the peak value of the A. C. tank voltage. At point O, condenser 42 has no charge of its own and neither diode 44 nor diode 45 is conductive. When the A. C. voltage reaches point A, diode 45 starts to conduct and continues conductive through to point H. This causes condenser 42 to acquire a charge, which at point H, equals the peak value of the A. C. voltage, at which time the plate of condenser 42 which is connected to the diodes, is positive with respect to the plate of condenser 42 which is connected to grid 39. From points H to J of curve 48, neither diode 44 nor diode 45 is conductive, and therefore curve 48 between points H and J resembles curve 47 between points B and M. At point J, however, the potential of the charge in condenser 42 balances the potential across resistor 22. As the A. C. tank voltage continues positive from point J, diode 44 is conductive until point K, by which time it has neutralized the charge in condenser 42 thereby restoring the initial condition.

Inasmuch as the frequency of the effective electronic switching by diodes 44 and 45 may have any value higher than the highest wanted frequencies in the signal voltages from source 10, the embodiment of Fig. 1 as well as the remaining embodiments to be described, are arranged to have two switching cycles for each cycle of the frequency of oscillator 17.

A system as illustrated in Fig. 1, has been found to possess a satisfactory degree of frequency stability and amplitude stability. While the amplitude of the A. C. tank circuit voltage may not be exactly constant for all settings of potentiometer 13 or for all values of input signals, nevertheless it varies in a consistent manner unaffected by characteristics of the tubes. So long as the tank circuit voltage causes tube 34 to act as a limiter, then the signal across load resistor 49 is constant regardless of variations of the tank circuit A. C. voltage. The amplitude of this tank voltage depends upon the ratio of the tank circuit impedance at resonance to that impedance plus the feed-back resistance 38, and all the parameters involved can therefore be designed to have consistent values.

Figure 3:
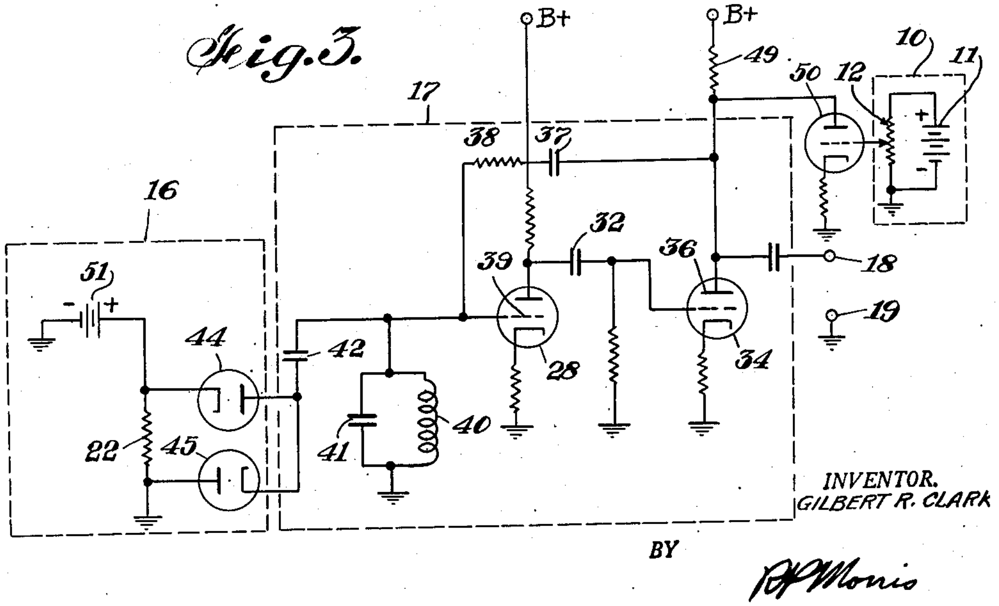
Fig. 3 is a modification of Fig. 1.

Referring to Fig. 3, there is shown a modification of the system of Fig. 2, wherein the signal modulations from the source 10, instead of being applied to produce variations of D. C. voltage across resistor 22, are applied in any well-known manner to vary the feed-back between plate 36 and grid 39 by means for example of a control tube 50. Thus, when the control tube 50 draws current through load resistor 49, the resulting IR drop lowers the supply voltage applied to plate 36. Therefore, the limited alternating voltage across resistor 49 is reduced in amplitude as is the alternating voltage across tank circuit 40, 41. In this embodiment, the voltage across the resistor 22 is at a fixed value, for example by means of battery 51, and frequency modulation is achieved by varying the amplitude of the alternating voltage. Therefore tube 50 is used in cooperation with unit 16 for modulation control. The remaining elements of the system of Fig. 3 are identical with those of Fig. 1 and their functioning is the same, so that further description thereof is not required at this point.

Figure 4:
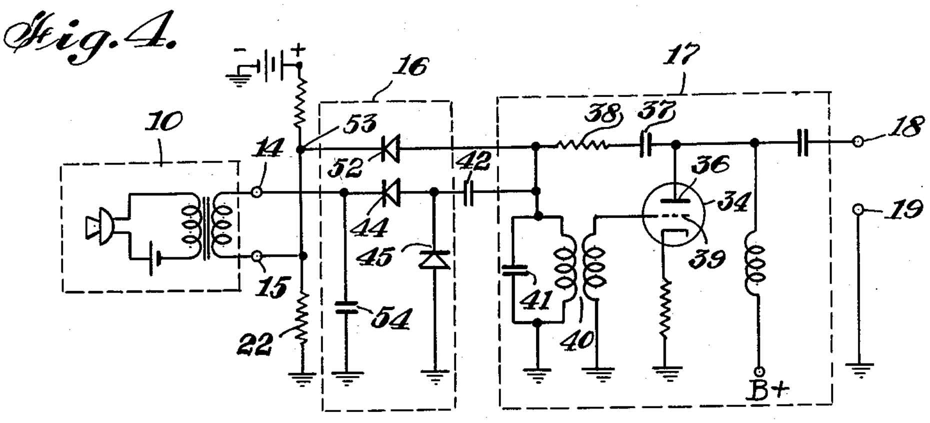
Figs. 4, 5 and 6 are further and respective modifications of Fig. 1.

Referring to Fig. 4, there is shown a modification of Fig. 1, wherein special means are provided for maintaining amplitude stability. In Fig. 4, the parts which function the same as those of Fig. 1 are designated by the same numerals. However, for simplicity, the oscillator 17 is shown as of the single tube type. The rectifiers 44 and 45 may be diode rectifiers or they may be any other form of rectifier such as selenium, copper oxide, germanium or other contact rectifier. Likewise, the additional rectifier 52 may be of the diode type or any one of the well-known contact rectifier types. When the peak value of the alternating current tank voltage exceeds the D. C. potential at point 53, rectifier 52 becomes conductive on positive peaks and increases the losses of the tank circuit. This inhibits the oscillator amplitude from building up beyond this point. The function of condenser 54 is to provide a radio frequency by-pass for the circuit which includes the input terminals 14, 15, and the resistor 22. It will be noted that in Fig. 4, the source 10 is schematically represented as a standard microphone input for producing voice frequency signals. The center frequency of the oscillator 17 is substantially independent of plate voltage variations. The D. C. voltage across resistor 22 determines the center frequency for a given signal input amplitude, but it also determines the amplitude of the voltage from oscillator 17. These two effects cancel each other as regards any change in the center frequency.

Figure 5:
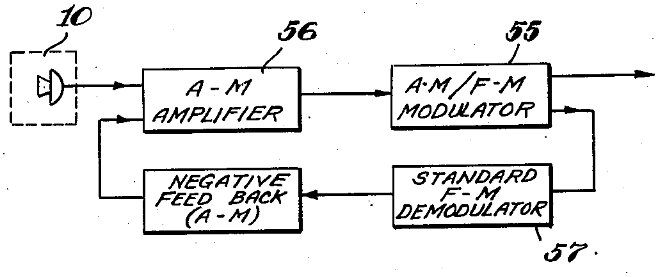

While the systems of Figs. 1, and 4 produce satisfactory linearity between input signals and output frequency modulations, it may be desirable to employ a special linearity control for this purpose. Such an arrangement is schematically illustrated in Fig. 5. In this figure, the block 55 represents the units 16 and 17 of any of the systems of Figs. 1, 3 and 4. However the device 55 is connected to the signal source 10 through any well-known amplitude modulation amplifier 56.

A portion of the output of the device 55 is then applied to any well-known frequency modulation demodulator 57, which applies a negative feedback potential which is combined with the original signal from source 10 and applied to the control electrode of the amplifier 56 in the manner well-known in negative feedback systems.

Figure 6:
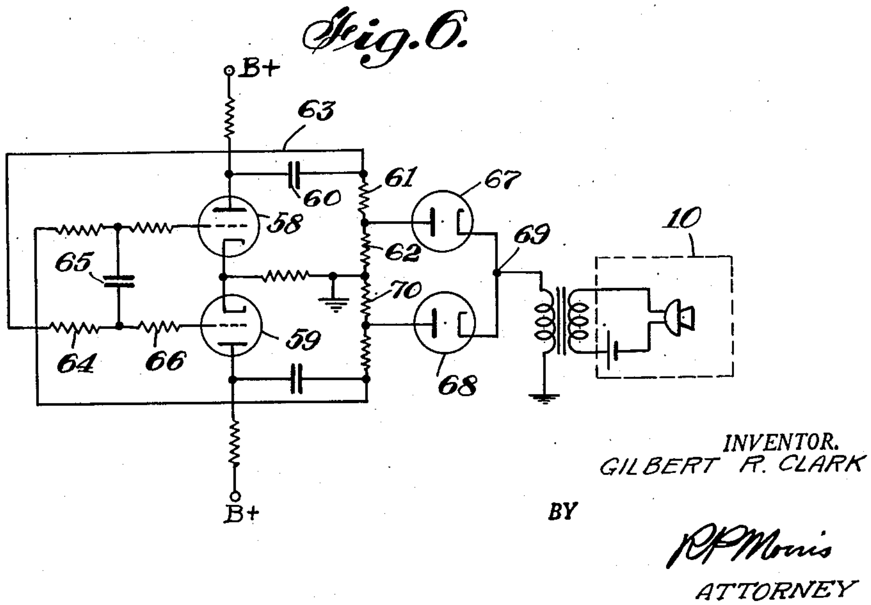

In the embodiment of Figs. 1, 3 and 4, the frequency modulation has been controlled by the effective electronic switching of the condenser 42. It will be understood, however, that frequency modulation can likewise be attained by similar switching in and out of inductances, resistors, or impedance networks. Fig. 6 illustrates the frequency modulation principle of this invention as applied to a resistance-capacity oscillator, wherein the electronic switching is effected on a resistance contained in the frequency-determining networks. In this embodiment, there is shown a symmetrical arrangement of two oscillator tubes 58, 59, although the invention can be equally well applied to a single oscillator tube. The output mesh of tube 58 comprising condenser 60 and resistors 61, 62 and is connected by means of conductor 63 to a second resistance-capacity mesh comprised of resistor 64 and condenser 65. Because of the symmetrical arrangement of the two tubes, a single condenser 65 can be employed, although if desired, the condenser 65 may be replaced by two series condensers each having twice the capacitance of condenser 65 and with their common or center connection grounded. This second mesh introduces an equal and opposite phase shift to that caused by the first mesh, 60, 61, 62, so that the signal at the grid of tube 59 is in phase with the signal at the plate of tube 58. A grid resistance 66 may be connected between the control grid of tube 59 and the second mesh so as to suppress parasitic oscillation. Tube 59 causes an 180 degree reversal of the signal at its plate circuit. After passing through two more meshes of a zero phase shift network, the signal is applied to the grid of tube 58 in the correct phase required to maintain oscillation. Since oscillators of this general type are well-known in the art, further description thereof is not believed necessary at this point. The modulating signals from source 10 are applied through the transformer 66 to the diodes or rectifiers 67, 68. If no modulating signal is present at the point 69, diode 67 conducts throughout the positive half cycle of the oscillator voltage across resistor 61, thereby shunting this resistor half of the time. The signal across the corresponding resistor 70 for the tube 59 is opposite in phase to that across resistor 61, and diode 68 shunts resistor 70 for similar half cycle periods. Depending upon the modulating signal polarity supplied at points 69, diodes 67 and 68 are conductive for more or less than half of the time, thereby correspondingly increasing or decreasing the oscillator frequency from its mean or center value.

While certain particular embodiments have been disclosed and described herein, various changes and modifications may be made therein without departing from the spirit and scope of the invention.

What is claimed is:

1. A frequency modulation arrangement for converting variable amplitude signals into corresponding frequency-modulated carrier, comprising a variable carrier frequency generator, a tuned oscillatory tank circuit for said generator and including a frequency-determining reactive circuit element which is arranged to be switched into and out of effective relation with said tank circuit, a pair of rectifiers connected to said element to effect said switching, and means to control the conductivities of said rectifiers jointly by said signals and by the alternating peak voltage of said tank circuit.

2. A frequency modulation arrangement according to claim 1 in which means are provided to maintain the alternating peak voltage of said tank circuit at a substantially uniform level.

3. A frequency modulation arrangement for converting variable amplitude signals into corresponding frequency-modulated carrier, comprising a variable frequency generator, a resistance-capacitance network for controlling the frequency of said generator, a pair of rectifiers for switching a frequency-determining capacitance element of said network into and out of effective frequency-determining relation with said generator, and means to control the conductivities of said rectifiers by the said variable amplitude signals and by the waves from said generator to effect said switching.

4. In a frequency modulating device, an oscillator including a frequency-determining tank circuit having a grounded and an ungrounded end, a capacitor directly connected to the ungrounded end of said tank circuit, electronic switch means for intermittently connnecting said capacitor to the grounded end of said tank circuit in parallel therewith to vary the resonant frequency thereof, said switch means including an electron discharge device and a cathode resistor series connected to ground for derivation of an output signal thereacross in response to variable amplitude signals fed to said discharge device, a pair of rectifiers, means connecting one of said rectifiers between said capacitor and a point intermediate said cathode and said cathode resistor, and means connecting the other of said rectifiers in opposite polarity between said capacitor and ground.

5. A frequency modulation circuit for converting variable amplitude signals into a corresponding frequency modulated carrier comprising a variable carrier frequency generator, a tuned oscillatory tank circuit for said generator and including a frequency determining reactive element, means connecting said reactive element for switching into and out of effective relation with said tank circuit, said means including a pair of rectifiers connected to said element to effect said switching in response to both said variable amplitude signals and to energy from said generator, and means maintaining the alternating peak voltage of said tank circuit at a substantially uniform level.

6. The device of claim 5 including means for switching said elements in and out of the circuit at an averaged rate determined by the modulating potentials.

GILBERT R. CLARK.

REFERENCES CITED

The following references are of record in the file of this patent:

UNITED STATES PATENTS

| Number | Name | Date |
|---|---|---|
| 2,032,620 | Langmuir | Mar. 3, 1936 |
| 2,033,231 | Crosby | Mar. 10, 1936 |
| 2,321,269 | Artzt | June 8, 1943 |
| 2,338,395 | Bartelink | Jan. 4, 1944 |
| 2,374,000 | Crosby | Apr. 17, 1945 |
| 2,397,992 | Stodola | Apr. 9, 1946 |
| 2,430,126 | Korman | Nov. 4, 1947 |
| 2,437,872 | Bailey | Mar. 16, 1948 |
| 2,469,837 | Mohr | May 10, 1949 |
| 2,473,556 | Wiley | June 21, 1949 |
| 2,474,261 | Leibe et al. | June 28, 1949 |